US005140245A

United States Patent [19]
Stacey

[11] Patent Number: 5,140,245
[45] Date of Patent: Aug. 18, 1992

[54] PMG-BASED POSITION SENSOR AND SYNCHRONOUS DRIVE INCORPORATING SAME

[75] Inventor: Eric J. Stacey, Penn Hills Township, Allegheny County, Pa.

[73] Assignee: Westinghouse Electric Corp., Pittsburgh, Pa.

[21] Appl. No.: 587,190

[22] Filed: Sep. 24, 1990

[51] Int. Cl.$^5$ .............................................. H02P 5/40
[52] U.S. Cl. .................................................. 318/723
[58] Field of Search .................. 318/661, 720–723, 318/138, 254; 324/173, 174, 86

[56] References Cited

U.S. PATENT DOCUMENTS

| | | | |
|---|---|---|---|
| 3,902,073 | 8/1975 | Lafuse . | |
| 4,134,106 | 1/1979 | Hungerford | 318/661 |
| 4,295,085 | 10/1981 | Lafuse | 318/721 |
| 4,489,266 | 12/1984 | Franzolini . | |
| 4,669,024 | 5/1987 | Stacey . | |
| 4,672,556 | 6/1987 | Shepler . | |
| 4,734,655 | 3/1988 | Kawai | 318/661 |
| 4,743,815 | 5/1988 | Gee et al. | 318/254 |
| 4,912,378 | 3/1990 | Vukosavic | 318/254 |
| 4,978,895 | 12/1990 | Schwarz | 318/254 |

Primary Examiner—David Smith, Jr.
Attorney, Agent, or Firm—R. P. Lenart

[57] ABSTRACT

A multiphased permanent magnet generator (PMG) driven by a rotating shaft, generates a multiphase output which is integrated and applied as the input to a high resolution phase locked loop having a binary counter with an output phase locked to the PMG multiphase output and representing shaft position. As applied to a high performance synchronous drive in which the PMG is driven by the synchronous machine, the digital shaft position signal is used to generate a multiphase current reference signal which is tracked by stator currents generated for the synchronous machine by a power current source. The multiphase current reference signal can be generated by a selected set of multiphase digital sine waveforms stored in a ROM which is part of the phase locked loop or is a separate waveform synthesizer.

22 Claims, 3 Drawing Sheets

PMG-BASED POSITION SENSOR AND SYNCHRONOUS DRIVE INCORPORATING SAME

BACKGROUND OF THE INVENTION

1. Field of the Invention

This invention relates to sensors for accurately determining the angular position of a high-speed rotating shaft, and to a high performance synchronous drive incorporating such an angular position sensor.

2. Background Information

Many state-of-the-art ac drives, industrial conveyors, positioning systems, and robotic manipulators employ controlled current power electronic converters to realize superior performance. To provide controlled current having precisely defined magnitude and phase related to mechanical position, high resolution position sensing devices are used to provide an appropriate phase reference. Typically, devices such as resolvers, magnetic and optical encoders, hall sensors and such are used for this purpose. There are many applications, however, which could benefit from a more rugged device which could operate at higher speeds, higher temperatures, at higher levels of vibration, and in a polluted environment. One such application is a spray oil cooled variable speed synchronous motor drive which must provide controlled torque from zero to 30,000 rpm at temperatures in excess of 200° C. Such a unit is found in an aircraft generator system in which the generator is operated as a synchronous motor to start the aircraft engine. The devices mentioned above, such as resolvers, magnetic and optical encoders, and hall sensors are not sufficiently rugged for use in such installations. The problem is complicated by the fact that the turbine engine must be capable of being started from a condition in which it is windmilling in the opposite direction.

Typically, aircraft starter generators have a permanent magnet generator which is used as an emergency electric power source and for control power.

It is a primary object of the invention to provide an improved high resolution, high speed rotating shaft position sensor.

It is an additional object of the invention to provide a position sensor which provides accurate position information as the rotating shaft dynamically passes through zero rpm.

It is also a primary object of the invention to provide an improved synchronous ac drive.

It is another object of the invention to provide such a sensor and ac drive which is rugged and reliable under hostile conditions.

It is yet another object of the invention to provide an improved ac drive which can be easily calibrated.

SUMMARY OF THE INVENTION

These and other objects are realized by the invention which is directed to an accurate high speed rotating shaft angular position sensor which utilizes a multiphase permanent magnet generator (PMG) connected to the rotating shaft and circuitry which generates a rotating shaft angular position signal from the multiphase signal generated by the permanent magnet generator. This circuit is preferably a phase locked loop which compares a multiphase set of reference signals to the phases of the permanent magnet generator output to generate a phase error signal which is used to generate the rotating shaft angular position signal. The rotating shaft angular position signal in turn establishes the phase of the reference signals which become phase locked to the PMG output. The PMG outputs signals are preferably integrated before being compared to the rotor reference signals. These integrated PMG outputs maintain their magnitude as the rotor dynamically passes through zero so that an accurate indication of shaft position is maintained as the shaft rotation changes direction. The absolute magnitude of the integrated PMG outputs is compared with a reference signal to generate an indication of the validity of the angular position signal as the shaft passes through zero. As long as a minimum rate of change is maintained, the signal will remain valid as the shaft comes to a stop and then rotates in the opposite direction.

This rotating shaft position sensor has a particular application to a high performance synchronous ac drive. The rotor angular position signal is used to generate a multiphase current reference signal for a power current source which generates the stator currents for a synchronous motor. The multiphase rotor reference signal generated in the phase lock loop of the angular position sensor can be used as the multiphase motor current reference signal. Alternatively, a separate current reference signal generator which synthesizes a set of ac waveforms from the digital rotor angular position signal can be used to generate the multiphase motor current reference signal used to control the power current source, and the rotor reference signal generator in the phase lock loop of the position sensor can be used to generate the multiphase motor reference signal with a selected phase angle with respect to the rotor angular position signal in order to calibrate the rotor angular position signal with respect to the physical angular position of the rotor. This eliminates the need to mechanically adjust the position of the PMG rotor on the motor shaft to achieve a desired torque angle for the motor.

With the drive in accordance with the invention, the motor can be started even when it is windmilling in the reverse direction. For initial starting from stand-still, and until the integrated PMG signals reach a preset magnitude, an independent reference signal is generated which starts at about zero frequency and accelerates at a fixed rate, so that the motor will start accelerating before any useful PMG voltage is available.

The position sensor and control system for a synchronous motor in accordance with the invention are very rugged and reliable even in very hostile environments.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
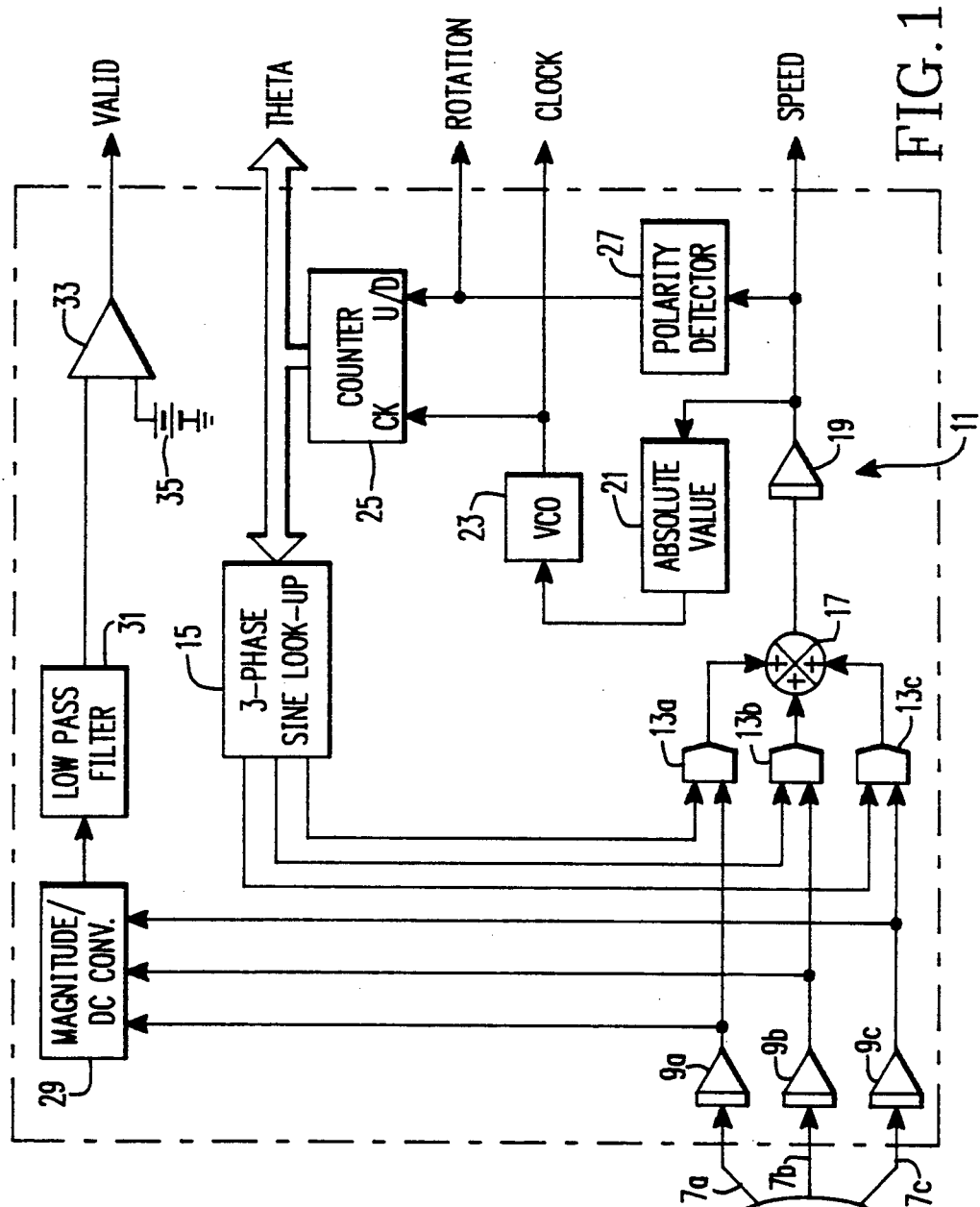
FIG. 1 is a schematic diagram of a rotating shaft angular position sensor in accordance with the invention.

FIG. 1 illustrates a position sensor 1 in accordance with the invention for generating a signal representing the absolute angular position of the rotating shaft 3. The position sensor 1 includes a multiphase permanent magnet generator (PMG) 5 driven by the shaft 3. The exemplary PMG 5 is a two-pole three-phase machine which produces one electrical cycle per revolution. When the shaft 3 is rotating, the open circuit output voltage on the leads 7a, 7b and 7c is a three-phase set of voltages having relative magnitudes which are a function of the position of the shaft 3. The magnitude and frequency of the set of voltages are proportional to speed, and therefore, the shaft 3 must be rotating in order to initially determine its position. To obtain signals which remain essentially constant over a wide range of frequency, the output of the PMG 5 feeds three operational integrators 9a through 9c. Since the gain of an integrator is inherently inversely proportional to the frequency, the resulting integrated output voltages have lower harmonic content and more accurately represent phase than those obtained from the PMG 5. To prevent the output of the ac integrators 9 from drifting, leakage resistors are deliberately connected across the integrator capacitors (not shown). To minimize errors, operational amplifiers optimized for low offset and low input bias currents are selected and the values of the integrating capacitor and the leakage resistors are selected so that the phase remains accurate within a desired tolerance over the normal range of speed. It is practical to achieve accuracies of better than two electrical degrees over a speed range exceeding 15 to 20,000 rpm. At very low speeds, (from 1 to 15 rpm), the phase error and resultant reduction amplitude can be calculated. This phase error is only of importance if very low speed operation is sustained.

A special phase locked loop 11 is used to track the phase of the ac integrator outputs and generate a binary coded signal indicating shaft position. The three-phase phase locked loop 11 includes phase comparators in the form of multiplying digital to analog converters 13a, 13b and 13c which multiply each phase of the analog integrated outputs of the PMG by a corresponding phase of a digital three-phase reference signal generated by a reference signal generator in the form of a three phase sine look-up table stored in a read only memory (ROM) 15. The separate analog phase error signals generated by the multiplying digital to analog converters 13 are summed in a summing junction 17. The resultant total phase error signal is integrated by error integrator 19 to generate an integrated total phase error signal. The magnitude of the integrated total phase error signal, as derived by the absolute value circuit 21, is applied to a voltage controlled oscillator (VCO) 23 which generates a pulse signal having a variable frequency which is proportional to the magnitude of the integrated total phase error signal. This variable frequency pulse signal is applied to a digital counter 25 which counts up or down dependent upon the sense of the integrated total phase error signal as detected by a polarity detector 27.

The output of the counter 25 is the digital binary shaft position signal, Theta. This binary shaft position signal is used to address the three-phase sine look-up; table stored in ROM 15 which generates the three-phase rotor position reference signal.

This phase locked loop circuit 11 phase locks the binary shaft position signal, Theta, to the multiphase PMG signal. Additional signals are available from the phase lock loop circuit 11. For instance, the integrated total phase error signal generated by the error integrator 19 is proportional to the speed of rotation of the shaft 3. In addition, the output of the polarity detector 27 provides a digital indication of the direction of rotation of the shaft while the variable frequency signal generated by the VCO 23 is available as a clock signal which is phase locked to the PMG voltage.

As previously mentioned, at very low speeds, the sensor 1 generates a phase error which can be calculated. To indicate the presence of the phase error, the magnitudes of the outputs of the ac integrators 9 are converted in a magnitude/dc converter 29 to a dc signal which is passed through a low pass filter 31 and compared in comparator 33 to a minimum voltage reference which may be provided by a battery 35. The voltage provided by the battery 35 is selected to be slightly lower than the asymptotic level, so that the state of comparator 33 then indicates when the data generated by the phase lock loop 11 are valid. For a case where the ac integrator frequency dynamically passes through zero, and does not dwell at low speed as rotation changes direction, then no significant drop in magnitude of the ac integrator outputs will occur and no substantial phase error will develop.

Operation of the position sensor 1 is as follows. When phase locked to a forward rotating PMG 5, positive sequence waveforms are produced and the binary counter 25 counts upwards. The output of the counter 25 then addresses three sets of ROM look-up tables 15 which generate binary representations of a three-phase set of sine waves which lead the voltages of the ac integrators 9 by 90 degrees. In this state, the average outputs of the multiplying digital to analog converters 13, and the output of the summing junction 17 are exactly zero, and the output of the error integrator 19 and the VCO 23 will remain constant.

If the binary count generated by the counter 25 begins to lag with respect to the phase of the ac integrator outputs, then the individual average outputs of the multiplying digital to analog converters 13 and the output of the summing junction 17 become positive, causing the output voltage of the error integrator 19 and the frequency of the VCO 23 to increase so that the binary count generated by counter 25 is advanced more rapidly until the proper phase relationship is regained.

If the binary count generated by the counter 25 begins to lead with respect to the phase of the outputs of the ac integrators 9, then the average outputs of the multiplying digital to analog converters 13 and the output of the summing junction 17 become negative, causing the output voltage of the error integrator 19 and the frequency of the VCO 23 to decrease so that the binary count generated by the counter advances less rapidly until the proper phase relationship is regained.

When phase locked to a reverse rotating PMG 5, negative sequence wave forms are produced and the polarity detector 27 will select the down counting mode for the counter 25. The output of the ROM look-up tables 15 now generates binary representations of a negative sequence three-phase set of sine waves which lead the integrator voltages by 90 degrees. The average outputs of the multiplying digital to analog converters 13 and the output of the summing junction 17 are exactly zero. The output of the error integrator 19 is negative, however, this is restored to a positive voltage at the input to the VCO 23 by the absolute value circuit 21. The frequency of the VCO 23 will remain constant. If the binary count begins to lag with respect to the phase of the outputs of the ac integrators 9, then the average outputs of the multiplying digital to analog converters 13 and the output of the summing junction 17 become positive, causing the integrator output voltage to become less negative and the input to the VCO 23 less positive so that its frequency decreases and the binary counter 25 counts down more slowly until the proper phase relationship is regained.

If the binary count generated by the counter 25 begins to lead with respect to the phase of the inputs of the multiplying digital to analog converters 13, then the outputs of these converters and the output of the summing junction 17 become negative, causing the output voltage of error integrator 19 to become more negative. This causes the output of the absolute value circuit 21 and the frequency of the VCO 23 to increase so that the binary count generated by the counter 25 moves downward more slowly until the proper phase relationship is regained.

At zero frequency, ideally the output of the error integrator 19 and the frequency of the VCO 23 will be zero, and the count will remain fixed. In practice, due to offset errors in the error integrator 19 and the VCO 23, the polarity of the error integrator 19 will drift slowly up and down and the polarity detector 27 will cause the counter to count up and down a few counts so that the mean count will still represent the phase of the input signal even at zero frequency.

If mounting of the PMG 5 is displaced from the desired angle, the accuracy of the resultant binary output can be corrected by providing a correspondingly displaced set of sine look-up tables in the ROM 15. In practice, since ROMs are readily available having space to hold several sets of look-up tables, spaced a few degrees apart, it is a simple matter to provide as many sets as required with switches to select the set needed for correct phasing of the binary output. If it is desired to vary the output phasing as a function of speed or some other parameter, the switches could be replaced with an appropriately decoded digital signal.

Figure 2:
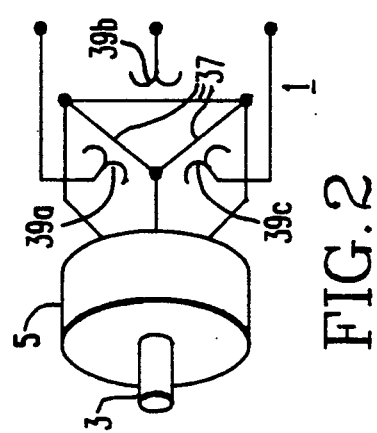
FIG. 2 is a schematic diagram of an alternate arrangement for integrating the outputs of a permanent magnet generator which forms part of the sensor of FIG. 1.

As an alternative to utilizing operational ac integrators 9 to generate the integrated PMG multiphase signal, the outputs of the PMG can be shorted by leads 37 and current sensors 39 can be used to generate the three-phase integrated PMG outputs by sensing the currents in the shorted leads as shown in FIG. 2.

Another basic variation that can provide greater accuracy, is to employ a PMG 5 having more than one pair of poles. The resulting output then repeats for each electrical cycle of the PMG.

The position sensor 1 can accurately indicate shaft position for a very wide range of speed, and can accurately keep track even when the speed dynamically passes through zero. When the shaft operates at sustained low speeds and some predictable angle error results, then the "valid" indicator is reset.

Figure 3:
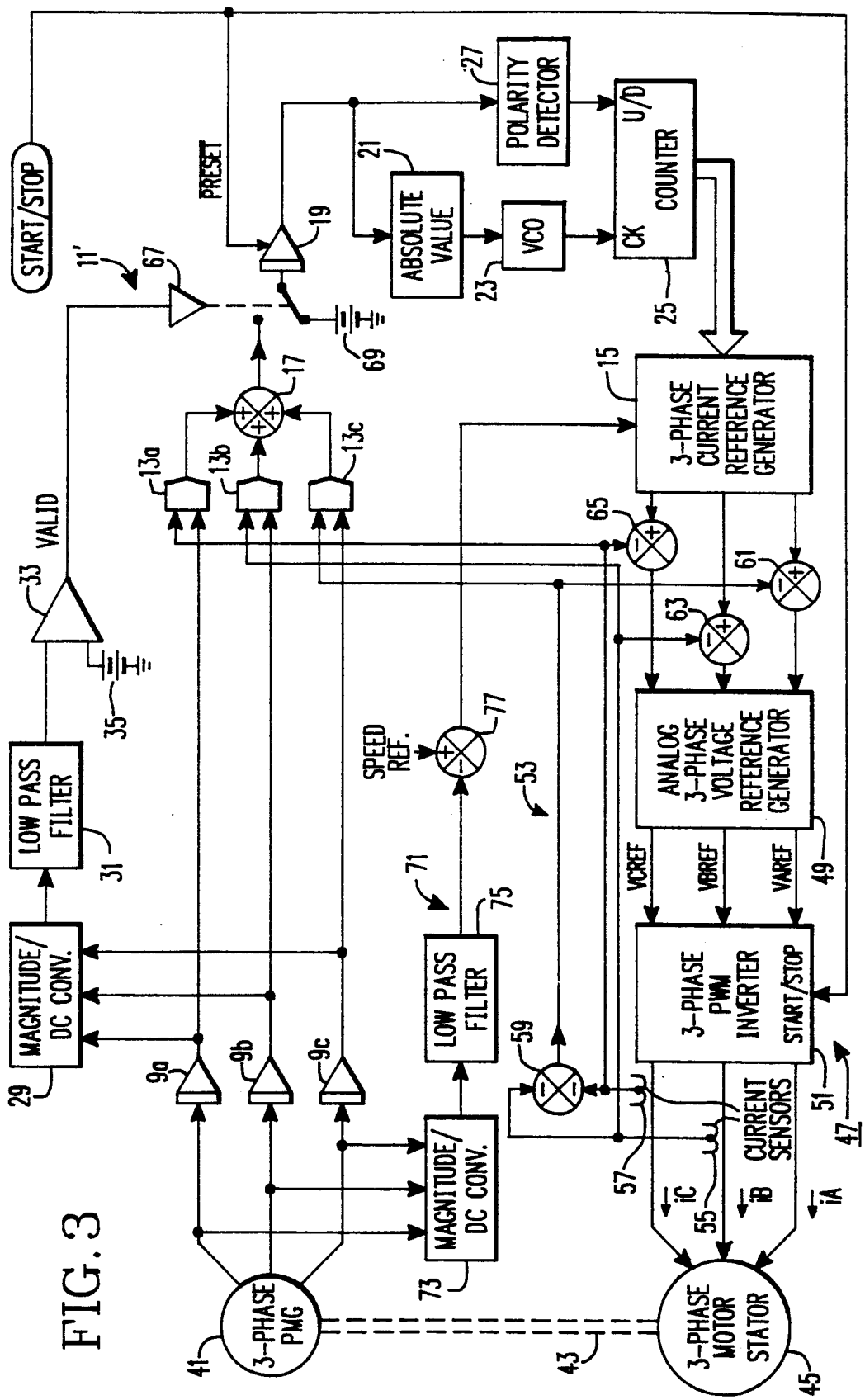
FIG. 3 is a schematic circuit diagram of a synchronous drive incorporating the angular position sensor of FIG. 1.

The PMG shaft position sensor can be utilized, for example, in a high speed drive. An example of such a drive is illustrated in FIG. 3. A 12-pole three-phase PMG 41 is mounted integrally on the shaft 43 of a three-phase synchronous motor 45. To obtain constant amplitude three-phase signals from the PMG 41 over a wide range of speed, the three ac integrators 9a, 9b and 9c having defined leakage resistance are implemented with precision low offset amplifiers. The output from these integrators 9a-9c form a three phase set of voltages whose instantaneous magnitudes accurately represent shaft position over a wide range of speed (1 to 20,000 rpm). The phase lock loop 11' generates in the up/down digital counter 25 an 8-bit binary reference angle representing electrical phase of the rotor of the motor 45 with a resolution of 1.4 electrical degrees or 0.23 mechanical degrees.

The phase locked loop 11' is basically the same as the phase locked loop 11 described in connection with the shaft position sensor illustrated in FIG. 1, and accordingly, like components are given like reference characters. The three-phase digital sinusoidal reference signal generated by the ROM 15 in addition to being compared with the integrated three-phase PMG outputs is also used as a reference for a controlled current inverter 47 which includes an analog three-phase voltage reference generator 49 which generates three voltage references for a three-phase pulse width modulated inverter 51. The inverter 51 generates the three-phase stator current for the motor 45. A closed feedback loop 53 ensures that the stator currents Ia Ib and Ic track the three-phase current reference generated by the ROM 15. This feedback loop includes a pair of current sensors 55 and 57 and the summing junction 59 which generates the third current reference and summing junctions 61, 63 and 65 which generate error signals between the three-phase current reference signal and the stator currents which are used to regulate the voltage reference generator 49. Prior to receiving the start signal, the frequency of the binary reference angle generated by the counter 25 is preset to zero by a preset signal applied to the error integrator 19. When starting from zero or very low speeds where the binary reference angle may not be phased locked and is not valid, an analog switch 67 controlled by the valid signal will disconnect the total phase error signal from the error integrator 19 and replace it with a minimum acceleration reference signal generated by a battery 69. Thus, when the preset signal is removed, the minimum acceleration reference signal generated by the battery 69 will ramp-up the reference frequency generated by the VCO 23 causing the stator currents generated by the inverter 51 to accelerate the rotor of the motor 45 in the forward direction. The start signal also is applied to the inverter 1 to enable the inverter firing circuit when the motor is to be started. Soon after the rotor begins to turn, the phase lock loop 11' will acquire phase lock and the ac integrator outputs will reach a sufficient magnitude to generate a "valid" signal. When a "valid" signal is received, control of the current reference waveform generator 15 is transferred to the phase error signal generated by the summing junction 17 which will cause an adjustment in the phase of the reference so that the stator currents generated by the inverter become locked with respect to rotor position at an angle selected to produce optimum torque over the full range of speed.

The speed of the motor is controlled by a speed feedback loop 71 in which a Magnitude/dc Converter 73 generates a speed feedback signal from the three-phase output of the PMG 41. The speed feedback signal is filtered in a low pass filter 75 and compared with a speed reference signal in summing junction 77 to generate a speed error signal which is applied to the current reference waveform generator 15 to control the magnitude of the current reference signal used as a set point for the inverter 51. by reducing the magnitude of the current when the desired speed is reached, the torque is reduced as needed to match the total mechanical loading.

Figure 4:
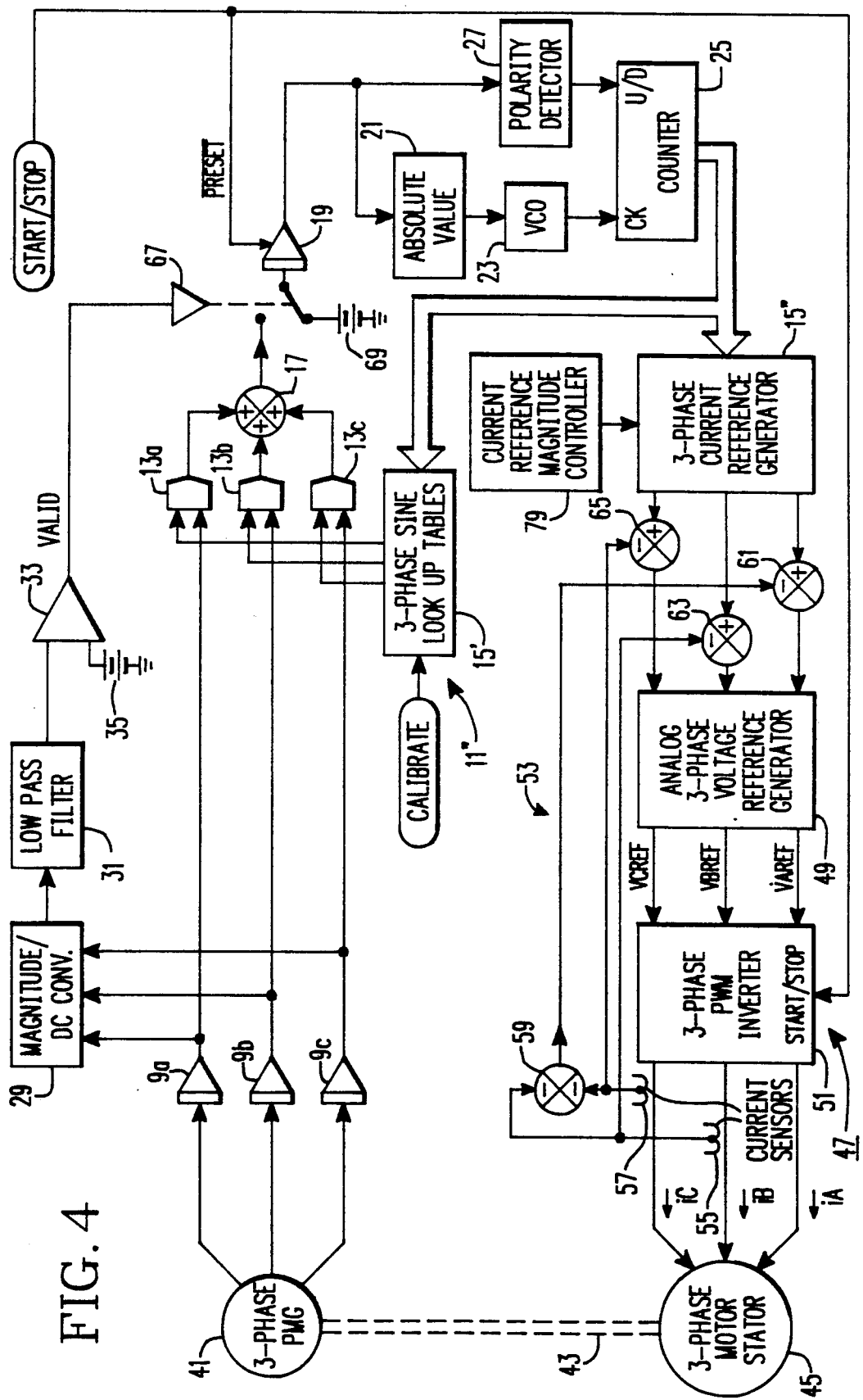
FIG. 4 illustrates another embodiment of a synchronous drive incorporating the PMG position sensor of FIG. 1 and with provision for phase calibration.

A modified form of a synchronous motor drive in accordance with the invention is illustrated in FIG. 4. Again, like reference characters are given to components which are common with the components of the synchronous drive illustrated in FIG. 3 and the position sensor of FIG. 1. In this drive, the reference waveforms generated in the ROM which forms the reference waveform generator 15" for the phase locked loop 11" are not used as the current reference for the controlled current inverter 47. Instead, a separate ROM current reference waveform generator 15' generates the three-phase current reference from the binary reference angle signal for controlling the inverter 47. A plurality of sets of three-phase sine look-up tables are stored in the ROM 15' of the phase locked loop 11" each generating a set of reference signals which has a different phase relationship to the binary reference angle signal. The appropriate set of look-up tables can then be selected to calibrate the phase of the binary reference angle signal to the position of the motor rotor. The selection of an appropriate set of sine look-up tables can also be made to adjust the torque angle.

In the synchronous drive of FIG. 4 open loop speed control is provided by the current reference magnitude controller 79. However, the closed loop feedback system described in connection with FIG. 3 can also be used with the drive of FIG. 4.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An absolute angular position sensor for a rotating shaft, comprising:
   a multiphase permanent magnet generator connected to said rotating shaft and generating a multiphase signal having a phase determined by the angular position of said shaft;
   means integrating the multiphase signal generated by said permanent magnet generator to generate an integrated multiphase signal;
   means generating a rotating shaft angular position signal from said integrated multiphase signal; and
   validity indicating means monitoring said integrated multiphase signal and generating a validity signal indicating said rotating shaft angular position signal is valid once said integrated multiphase signal has a magnitude above a pre-selected value.

2. The angular position sensor of claim 1 wherein said means generating said rotating shaft angular position signal includes a phase locked loop circuit generating said rotating shaft angular position signal phase locked to said integrated multiphase signal.

3. The angular position sensor of claim 2 wherein said phase locked loop circuit includes phase comparator means comparing said multiphase signal generated by said permanent magnet generator with a multiphase reference signal to generate a phase error signal, phase shifting means generating a variable frequency signal having a frequency determined by the phase error signal, generating means generating said rotating shaft angular position signal from said variable frequency signal, and reference signal generating means generating said multiphase reference signal from said rotating shaft angular position signal, said phase shifting means shifting the frequency of said variable frequency signal to reduce the phase error signal by shifting the phase of the rotating shaft angular position signal which in turn shifts the phase of the multiphase reference signal to bring the phase of said multiphase reference signal into quadrature relationship with said integrated multiphase signal when the phase error signal is substantially zero.

4. The angular position sensor of claim 3 wherein said signal generator is a digital counter which generates a digital rotating shaft angular position signal.

5. The angular position sensor of claim 4 wherein said digital counter is bi-directional, wherein said phase comparison means generates an analog phase error signal and wherein said phase shifting means includes an integrator integrating said phase error signal to generate an analog integrated error signal, a voltage controlled oscillator generating said variable frequency signal with a frequency proportional to the magnitude of said integrated error signal, and a sign detector responsive to the sign of the integrated error signal, said bi-directional counter counting at the frequency of said variable frequency signal and in a direction determined by said sign detector to produce said digital rotating shaft angular position signal for rotation of said shaft in either direction.

6. The angular position sensor of claim 1 wherein said means integrating said multiphase signal generated by said permanent magnet generator comprises ac integrators integrating each phase of the multiphase signal generated by said permanent magnet generator.

7. The angular sensor of claim 1 wherein said means integrating the multiphase signals generated by said permanent magnet generator comprises means shorting the phases of said permanent magnet generator and current sensors generating the current signal for each shorted phase of said permanent magnet generator.

8. A control system for multiphase synchronous machine having a rotor and a multiphase stator winding, said system comprising:
   a permanent magnet generator (PMG) coupled to said rotor and generating a multiphase PMG signal having a phase determined by the angular position of said rotor of the synchronous machine;
   means integrating the multiphase PMG signal to generate an integrated multiphase PMG signal;
   rotor position sensing means generating a rotor angular position signal from said integrated multiphase PMG signal;
   validity indicating means monitoring said integrated multi-phase PMG signal and generating a validity signal indicating said rotor angular position signal is valid once said integrated multiphase PMG signal has a magnitude above a pre-selected value;
   current reference signal generating means generating a multiphase current reference signal having a selected phase relationship to said rotor angular position signal; and
   power current source means generating currents int he multi-phase stator winding having phases which track said multiphase current reference signal and an amplitude determined by said multiphase current reference signal.

9. The control system of claim 8 wherein said power current source means includes a power current source, and a feedback loop including means generating a multiphase feedback current signal proportional to the multiphase stator winding current and error signal generating means comparing each phase of the multiphase current feedback signal to a corresponding phase of said multiphase current reference signal to generate motor current phase error signals which are applied to said power current source to generate said multiphase stator winding current in a sense which drives said motor current phase error signals to zero.

10. The control system of claim 8 wherein said rotor position sensing means includes means selectively adjusting the phase of said rotor position signal to the phase of the integrated multiphase PMG signal.

11. The control system of claim 9 including speed control means comprising means generating a speed, signal, proportional to the absolute magnitude of said integrated multiphase PMG signal, and means comparing said speed signal to a speed reference signal to generate a speed error signal, and said current reference signal generating means setting the magnitude of said multiphase current reference signal as a function of said speed error signal.

12. The control system of claim 8 wherein said rotor sensing means and current reference signal generating means comprise a phase locked loop phase locking said integrated multiphase current reference signal to said multiphase PMG signal.

13. The control system of claim 12 wherein said phase locked loop circuit includes phase comparator means comparing said integrated multiphase PMG signal with said multiphase current reference signal to produce a phase error signal, phase shifting means generating a variable frequency signal having a frequency determined by said phase error signal, signal generating means generating said rotor angular position signal from said variable frequency signal, and current reference signal generating means generating said multiphase current reference signal from said rotating shaft angular position signal, said phase shifting means shifting the frequency of said variable frequency signal to reduce the phase error signal by shifting the phase of the rotating shaft angular position signal which in turn shifts the phase of the multiphase current reference signal to bring the phases of said multiphase current reference signal into quadrature relationship with said integrated multiphase PMG signal when the phase error signal is substantially zero.

14. The control system of claim 13 wherein said signal generator is a bi-directional digital counter, wherein said phase comparison means generates an analog phase error signal, and wherein said phase shifting means includes an integrator integrating said phase error signal to generate an analog integrated error signal, a voltage controlled oscillator generating said variable frequency signal with a frequency proportional to the magnitude of said integrated error signal, and a sign detector responsive to the sign of the integrated error signal, said bi-directional counter counting at the frequency of said variable frequency signal and in a direction determined by said sign detector to produce a rotating shaft angular position signal for rotation of said rotating shaft in either direction.

15. The control system of claim 14 including starting means selectively disconnecting said analog integrated error signal from said voltage controlled oscillator and applying in its place a starting reference signal.

16. The control system of claim 15 wherein said starting means automatically applies said starting reference signal to said voltage controlled oscillator in place of said integrated phase error signal when the magnitude of said multiphase integrated PMG signal is below a preset value.

17. The control system of claim 8 wherein said rotor position sensing means comprises a phase locked loop generating said rotor angular position signal phase locked to said integrated multiphase PMG signal.

18. The control system of claim 17 wherein said phase locked loop includes phase comparison means generating a phase error signal between the phases of said integrated multiphase PMG signal and a multiphase rotor reference signal, phase shifting means generating a variable frequency signal having a frequency determined by said phase error signal, position signal generating means generating said rotor angular position signal from said variable frequency signal, and rotor reference signal generating means generating said multiphase rotor reference signal from said rotor angular position signal, said phase shifting means shifting the frequency of said variable frequency signal to reduce the phase error signal by shifting the phase of the rotor angular position signal which in turn shifts the phase of the rotor reference signal to bring the phases of said rotor reference signal into quadrature relationship with said integrated multiphase PMG signals when the phase error signal is substantially zero.

19. The control system of claim 18 wherein said rotor reference signal generating means includes means for selecting a phase angle between said rotor angular position signal and said multiphase rotor reference signal for calibrating said rotor angular position signal.

20. The control system of claim 19 wherein said signal generator is a bi-directional digital counter, wherein said phase comparison means generates an analog phase error signal and wherein said phase shifting means includes an integrator integrating said phase error signal to generate an analog integrated error signal, a voltage controlled oscillator generating said variable frequency signal with a frequency proportional to the magnitude of said integrated error signal, and a sign detector responsive to the sign of the integrated error signal, said bi-directional counter counting at the frequency of said variable frequency signal and in a direction determined by said sign detector to produce a rotor angular position signal for rotation of said rotor shaft in either direction.

21. The control system of claim 20 including starting means selectively disconnecting said analog integrated error signal from said voltage controlled oscillator and applying in its place a starting reference signal.

22. The control system of claim 21 wherein said starting means disconnects said integrated phase error signal from said voltage control oscillator and substitutes said starting reference signal when the absolute magnitude of said integrated multiphase PMG signal is below a preset value.

* * * * *